Nov. 3, 1970   B. L. WELLER ET AL   3,537,866
METHOD OF PRODUCING A PACKAGED WHIPPED CREAM LAYER CAKE
Filed July 14, 1967

INVENTORS
Harold M. Pick
Berthold L. Weller
Andrew Wolf
BY Dressler, Goldsmith, Clement & Gordon
ATTORNEYS

United States Patent Office 3,537,866
Patented Nov. 3, 1970

3,537,866
METHOD OF PRODUCING A PACKAGED WHIPPED CREAM LAYER CAKE
Berthold L. Weller and Andrew Wolf, Deerfield, and Harold M. Rich, Northbrook, Ill., assignors to Kitchens of Sara Lee, Inc., a corporation of Maryland
Continuation-in-part of application Ser. No. 559,583, June 22, 1966. This application July 14, 1967, Ser. No. 653,473
Int. Cl. A21d 13/08
U.S. Cl. 99—180
4 Claims

ABSTRACT OF THE DISCLOSURE

The present invention is directed to a method of producing a whipped cream layer cake within an open-ended container which serves as a form of mold for the building and frosting of the cake therein. A layer of cake is placed within the container followed by a layer of whipped cream and a second layer of cake. The second cake layer is then pressed down to extrude a portion of the whipped cream from between the layers into the space provided between the cake sides and the container sidewall to cover the sides of the cake. Successive layers of whipped cream and cake are added followed by the requisite tamping action until a cake of the desired amount of layers is produced. A topping is then placed on the cake, after which the container is closed and the cake frozen.

---

This application is a continuation-in-part of application Ser. No. 559,583, now abandoned filed June 22, 1966, in the names of Harold M. Rich, Berthold L. Weller, and Andrew Wolf, and assigned to the assignee of the present invention.

The present invention relates to a method of producing a layer cake within a container having whipped cream disposed between adjacent layers and on the sides and top of the cake. While the application is directed towards whipped cream, this is merely intended to be a preferred embodiment. The novel method covered herein is applicable to other non-flowable filling or covering materials used for cakes, such as butter cream, custards, fudges, or combinations thereof. The cake is formed in place within a container that is subsequently sealed to form a fully enclosed package. The container is designed to serve as a mold for the cake being formed and functions to retain the cake against relative movement. The packaged cake is then frozen, which further enhances the positive positioning between the cake and its container.

Before the present invention, whipped cream cakes were produced manually, in which case the cake received from the oven was first sliced and the filling located between and around the layers was placed in position by various types of visually positioned hand-operation equipment. The cake was then placed in a box, such as a cardboard type of the folded variety. It can be appreciated that with this type of an arrangement extra precautions must be taken during shipping and handling in order to maintain an attractive-looking cake.

A method of the type previously described makes it quite difficult to obtain a uniform distribution of the whipped cream between the layers and along the sides, since there is no retaining means provided which serves to define the configuration of the cake as it is being produced.

In accordance with the present invention, there is provided a method of producing a whipped cream layer cake whereby the whipped cream introduced into the container is uniformly distributed between the layers of the cake and around the outer surface thereof. The novel method disclosed herein takes advantage of the inherent properties of whipped cream and utilizes its flow characteristics to dispose the whipped cream between the cake and the surrounding container. The cake is produced in situ within its ultimate package, which package serves as a mold which thus eliminates the previously required independent step of packaging the finished cake, which carries with it many obvious problems.

Essentially, the method forming the essence of the present invention consists of placing a cake layer on a bottom platform of a container having a rigid sidewall which defines the outer circumference of the cake. The diameter of the cake layer is slightly less than that of the outer rigid sidewall of the container to provide a space for the whipped cream to be extruded into and cover the sides of the cake.

After the cake has been disposed in position, a specified quantity of whipped cream is then introduced into the containr above the cake layer, which due to its consistency will essentially remain in the position it has been placed within the container. The quantity introduced is that amount necessary to provide a certain thickness of filling between the cake layers plus that required to fill the void between the sides of the cake and the container. After the whipped cream is introduced, a second cake layer is placed on the whipped cream following which a tamping mechanism having substantially the same diameter as that of the cake layer is pressed against the second layer cake. The tamping action extrudes out a certain portion of whipped cream from between the cake layers to fill the gap between the sides of the container and the cake. The dimensions of the cake layers and container are chosen in conjunction with the tamping forces and quantity of whipped cream introduced to provide generally uniform thickness of the whipped cream between the cake layers and along the sides thereof.

Succeeding layers of whipped cream and cake are then introduced and the operation repeated until a layer cake of the requisite number of layers has been made. After the cake has been built up to the desired number of layers, such as four, for example, a top coating of whipped cream, or other topping, is placed on the cake and the container sealed up.

It is noted that there is normally provided a liner adjacent the container sidewall. This liner defines the outer periphery of the cake and serves to retain the cake in position within the container, as well as forming an outer design on the cake if such is desired. The liner is a material that will facilitate removal of the liner from the cake without damage to the cake. In addition, the container can be designed so that a tear strip located at the bottom thereof will permit ready disassembly of the package, but permit re-enclosure thereof to facilitate storing of the cake in the event it is not consumed at one sitting.

After the cake has been assembled in the container and the container sealed, the complete package is then frozen, with the result that the positioning between the cake and the liner will be further solidified to prevent relative movement of the cake during the shipping operation.

Many advantages will apparent from the foregoing description taken in conjunction with the following drawings, in which.

Figure 1:
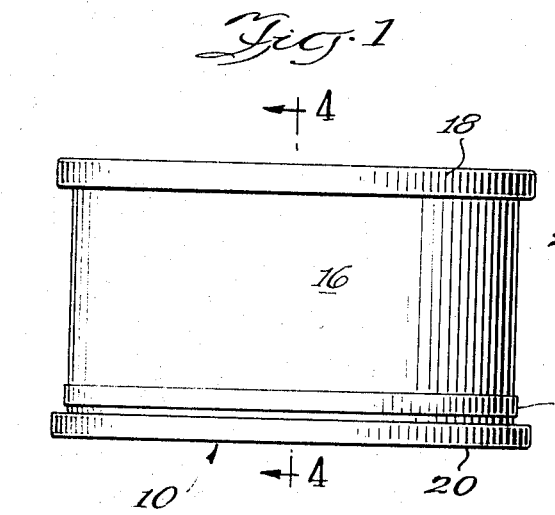
FIG. 1 is an elevational view of a sealed package containing a whipped cream layer cake.

Referring first to FIG. 1, it will be seen that the reference numeral 10 indicates generally a sealed package containing a whipped cream layer cake. The package 10 comprises a cylindrical container 15 having a vertical sidewall 16 and top and bottom walls, or lids 18 and 20, respectively. In the embodiment illustrated, the container sidewall 16 is made of convolutely wound paperboard and the lids 18 and 20 are made of suitable metal alloys. The various parts are connected together in a well known manner to provide a container which is extremely sturdy and highly resistant to shock and crushing forces. It is obvious that other rigid materials, such as metals and plastics may also be employed for the container parts, if desired. In any event, the rigid and non-porous materials described comprise a hermetically sealed package, which is highly desired for preventing and retarding spoilage of the cake.

To provide access to the sealed package, means are provided for opening the container 15 at the bottom thereof. As illustrated in the preferred embodiment, the opening means comprises a tear tape, a strip 22, which is formed integrally with the sidewall 16 by processes well known to those versed in the art. It should be noted, however, tear strip 22 is positioned adjacent the bottom lid 20. Thus, the tear strip functions to sever the bottom lid 20 from substantially the entire height of the sidewall 16 for reasons which will become apparent as the description proceeds.

Figure 4:
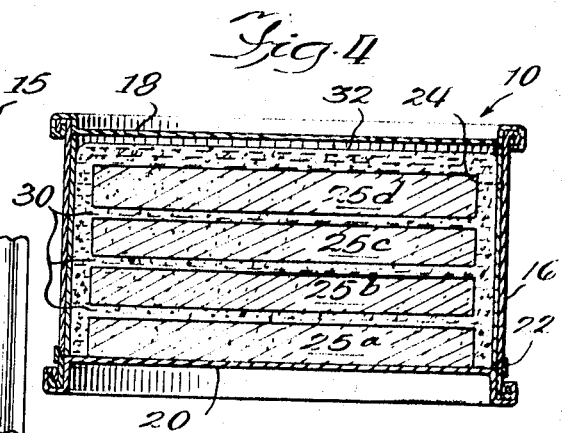
FIG. 4 is a cross section of a finished four-layer whipped cream cake within the container.

Positioned within the container 15 and concentric with the sidewall 16 is a thin liner 24 which may be made of paper products, or plastics having relatively easy release characteristics from a filling and coating material, such as whipped cream. Examples of liners that can be used are parchment and polyethylene coated paper or paperboard. Referring to FIG. 4 of the drawings, it will be noted that the liner 24 is the same height as the distance between the lids 18 and 20, so that vertical movement thereof within the package is prevented.

Figure 5:
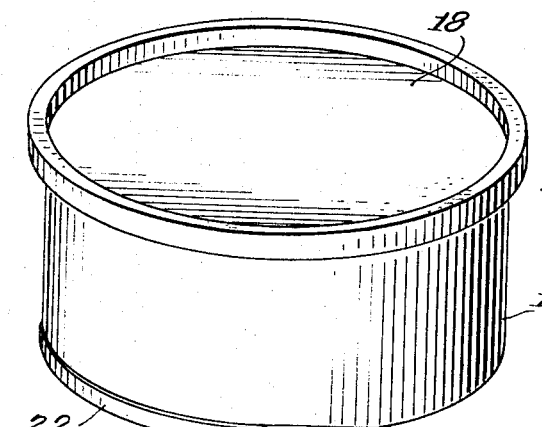
FIG. 5 is a perspective view showing the separated parts of the package after opening and with the liner member partially removed from the cake.
Figure 5:
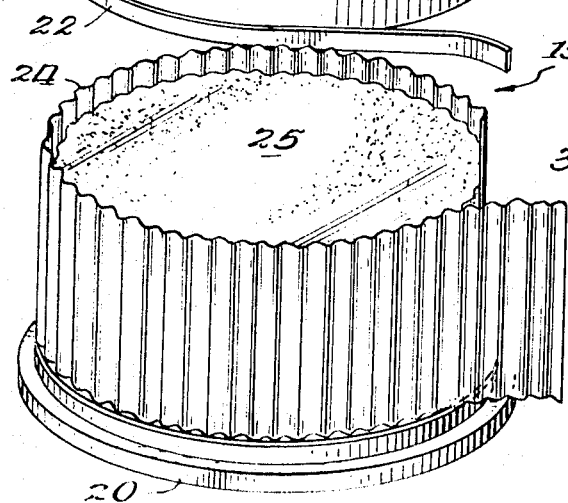

Turning now to FIGS. 4 and 5, there is shown a completed frozen whipped cream, four-layer cake 25 positioned on the bottom lid 20 of the container and extending upwardly to a point spaced slightly below the top lid 18. The cake 25 is round in configuration and its outer diameter is substantially identical with the inner diameter of the container sidewall 16, with any existing difference resulting from the thickness of the liner 24 positioned therebetween. In this regard, the liner 24 may be plain, or formed with a pattern such as the scalloped or wave-like liner illustrated. Where the liner is patterned, the coating on the sidewalls of the cake 25 assumes, or is molded into, the same pattern because of the method of manufacture, which will subsequently be fully described. In either case, it will be appreciated that the rigid and shock-resistant container 15 retains the cake 25 in substantial contour-accommodating relationship. The cake is likewise prevented from all vertical movement because of the adherence of the frosting on the cake sidewalls to the liner 24, which is itself immovably retained between the lids 18 and 20.

In order to open the package 10, it is necessary merely to pull the tear strip 22 and sever the container sidewall 16 from the bottom lid 20 (see FIG. 5). The top lid 18 and sidewall 16 may now be lifted and the liner 24 readily peeled away from the cake 25. It will, of course, be observed that the separated bottom lid 20 now affords an ideal cutting platter and/or serving tray for the cake. If unused cake portions remain, the top lid and sidewall may be connected once again to the bottom lid whereupon the frictional fit therebetween provides a safe and relatively airtight container for the remaining cake.

Figure 2:
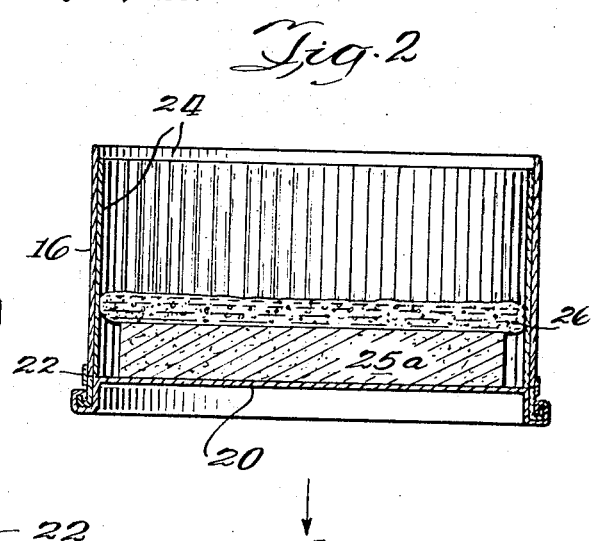
FIG. 2 is a cross-sectional view of the open container showing a first layer in position with a layer of whipped cream placed thereon.
Figure 3:
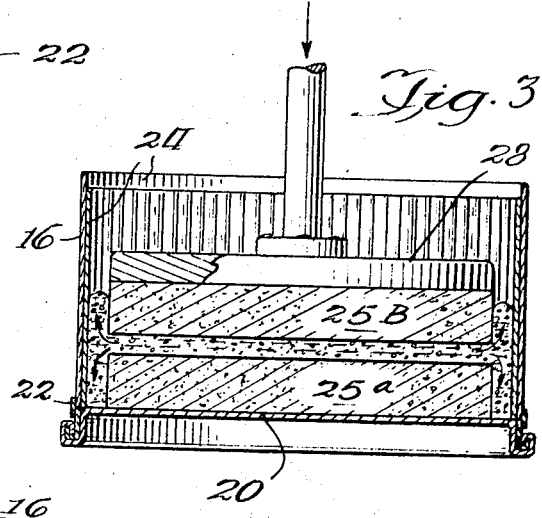
FIG. 3 is a view showing a second cake layer disposed in position with a tamping mechanism acting there-against and illustrating the flow pattern of the whipped cream.

In accordance with the novel method of producing a multi-layer whipped cream cake herein described and illustrated in FIGS. 2, 3, and 4, a bottom cake layer 25a is placed on the bottom wall 20 of the container. This cake has a diameter slightly less than that of the liner 24 to permit the subsequent introduction of whipped cream into the space defined between the liner and the cake to provide a coating for the cake. A layer of whipped cream 26 is then introduced into the space above the cake layer 25a, as shown in FIG. 2. The whipped cream is of such a viscosity that it will essentially remain in the position shown in FIG. 2. That is to say that the whipped cream is of such a consistency that it will normally not flow unless an outside force is applied thereto. It is again noted that while reference has been made to whipped cream, the present invention also applies to butter creams, custards, fudges, or combinations thereof, which can be referred to as pseudo-plastic materials.

Following the introduction of whipped cream, a second cake layer 25b is placed on top of the whipped cream layer 26 in the manner as shown in FIG. 3. After the second layer has been moved into position by manual or automatic means, a tamping mechanism schematically illustrated at 28, which can be hand-operated, or machine-operated, is then placed against the upper surface of cake layer 25b, and pressed down with sufficient force to extrude some of the whipped cream out from between the cake layers 25a, 25b. The whipped cream so extruded will move downwardly and upwardly, as indicated by the arrows, into the space between the cake layers 25a, 25b, and the liner 24 to fill the same.

As shown in FIG. 4, the layer cake illustrated as being produced by this method has four layers which would be formed by the introduction of a subsequent whipped cream layer 30 and a third cake layer 25c followed by another layer of whipped cream 30 and a fourth cake layer 25d. The introduction of each cake layer is followed by a suitable tamping action. After the whipped cream layers and cake have been assembled in the container, a frosting, or topping of whipped cream, or other suitable material 32, can then be introduced. During the practice of the method, the liner 24 acts as a mold for the finished product. The top lid 18 is then applied to the container by normal procedures to provide the completed and seal package 10. The completed package can then be placed in a freezer to freeze the cake so formed within the container.

It is, of course, obvious that variations of the above-described method are contemplated by the present invention. For example, the layer cake could be made up of two, or more layers, and is not restricted to the four-layer embodiment illustrated in the drawings. Also, the fillings may be varied at each layer to create different flavors. In addition, the liner may be round and the container some other configuration, and the linear may be coated with nut meats, fruit pieces, candy pieces, or other decorative materials, which will adhere to the sidewalls of the cake when removed from the container.

While the invention has been described with regard to a round cake and a cylindrical container, it is appreciated that this design is by way of example only. Furthermore, the liner may be eliminated, in which case the container would serve as the mold for the cake and means other than the tear strip shown may be employed for opening the package.

It is, of course, intended to cover by the appended claims all such variations as fall within the true scope thereof.

What is claimed is:

1. A method of producing a packaged, nonflowable type cream layer cake including the steps of alternately placing layers of cake and nonflowable cream into an open-ended container with the cake layers being spaced from the container sidewall, exerting a force against the second and any additional layers to extrude out the portion of the cream between the cake layers into the space between the cake layers and container sidewall to coat the sides of the cake layers with a substantially uniform coating, and covering the container to retain the cake in position therein including the further step of placing a liner in said container adjacent to the container sidewall prior to the introduction of the layers of cake and cream, which liner serves to retain the cake in position in said container while permitting access to the cake without defacing its outer surface.

2. The method as set forth in claim 1 in which the liner serves as the mold for the cake and the cream substantially fills the space provided between the liner and the cake, and the final step before sealing the container is the placing of a frosting on the top cake layer.

3. A method of producing a four-layer whipped cream cake in an open-ended container having a liner disposed in the container adjacent to the sidewall, including the steps of introducing an unfrosted cake layer on the bottom of the container in spaced relationship from the liner, placing a first layer of whipped cream onto the cake layer, adding a second cake layer on top of said first cream layer, applying a force against the second cake layer to extrude a portion of the first layer of cream outwardly thereof to fill the space between the sides of the first and second layers and the liner, introducing a second layer of whipped cream and a third cake layer on top thereof, applying a force to the third cake layer to extrude a portion of the whipped cream located between the second and third layers to fill the space between the sides of the last mentioned cake layers and the liner, adding a third layer of whipped cream and a fourth cake layer on top thereof, exerting a force against the fourth layer to extrude out a portion of the third layer of whipped cream to fill the space between side of the fourth cake layer and the liner, adding a frosting on top of the fourth cake layer and closing the container to provide a completed package.

4. A method as set forth in claim 3 including the steps of providing a liner having easy release characteristics on its inner surface, said liner extending the full height of the container to positively locate the cake within the container, and freezing the completed package to positively secure the cake in position within the container.

References Cited
UNITED STATES PATENTS

| | | | |
|---|---|---|---|
| 1,437,512 | 12/1922 | Gereke. | |
| 1,927,435 | 9/1933 | Derst | 99—181 |
| 2,220,971 | 11/1940 | MacManus | 99—92 XR |

LIONEL M. SHAPIRO, Primary Examiner

J. R. HOFFMAN, Assistant Examiner

U.S. Cl. X.R.
99—92, 181, 192